United States Patent [19]

Keskar et al.

[11] Patent Number: 5,964,922
[45] Date of Patent: Oct. 12, 1999

[54] SOLID ELECTROLYTE IONIC CONDUCTOR WITH ADJUSTABLE STEAM-TO-OXYGEN PRODUCTION

[75] Inventors: Nitin Ramesh Keskar, Grand Island; Ravi Prasad, East Amherst; Christian Friedrich Gottzmann, Clarence, all of N.Y.

[73] Assignee: Praxair Technology, Inc., Danbury, Conn.

[21] Appl. No.: 08/972,412

[22] Filed: Nov. 18, 1997

[51] Int. Cl.[6] .................................................. B01D 53/22
[52] U.S. Cl. ...................................... 95/39; 95/54; 95/288
[58] Field of Search .................................. 95/39, 45, 54, 95/288

[56] References Cited

U.S. PATENT DOCUMENTS

| | | | |
|---|---|---|---|
| 4,167,457 | 9/1979 | Giner ........................................... | 204/1 |
| 5,035,726 | 7/1991 | Chen et al. ................................... | 95/54 |
| 5,160,713 | 11/1992 | Mazanec et al. ......................... | 423/210 |
| 5,205,842 | 4/1993 | Prasad ..................................... | 95/54 X |
| 5,306,411 | 4/1994 | Mazanec et al. ......................... | 204/265 |
| 5,354,547 | 10/1994 | Rao et al. ................................ | 95/45 X |
| 5,435,836 | 7/1995 | Anand et al. ................................ | 95/45 |
| 5,447,555 | 9/1995 | Yee et al. ..................................... | 95/54 |
| 5,516,359 | 5/1996 | Kang et al. ................................... | 95/14 |
| 5,547,494 | 8/1996 | Prasad et al. ................................. | 95/54 |
| 5,562,754 | 10/1996 | Kang et al. ................................... | 95/54 |
| 5,565,017 | 10/1996 | Kang et al. ................................... | 95/14 |
| 5,584,194 | 12/1996 | Gardner ................................... | 95/54 X |
| 5,611,842 | 3/1997 | Friesen et al. ........................... | 95/45 X |
| 5,643,354 | 7/1997 | Agrawal et al. .......................... | 75/490 |
| 5,733,435 | 3/1998 | Prasad et al. ............................ | 95/54 X |
| 5,753,007 | 5/1998 | Russek et al. ........................... | 95/54 X |
| 5,753,010 | 5/1998 | Sircar et al. ................................ | 95/45 |

FOREIGN PATENT DOCUMENTS

| | | | |
|---|---|---|---|
| 2257054 | 1/1993 | United Kingdom ........................ | 95/54 |

OTHER PUBLICATIONS

Suitor et al., "Development of Alternative Oxygen Production Source using a Zirconia Solid Electrolyte Membrane", JPL Pub. D–7790 (1990).
*Coal Liquefaction and Gasification Technologies*, Mangold et al., pp. 133–145 and 209–219 (1982).

Primary Examiner—Robert Spitzer
Attorney, Agent, or Firm—Bharat C. Gandhi

[57] ABSTRACT

A process for producing a gas stream containing oxygen and steam to feed a coal gasifier or other downstream process by compressing and heating a feed gas stream, and separating the heated feed gas stream into an oxygen-depleted gas stream on a retentate side of an ion transport membrane and an oxygen-containing gas stream on a permeate side. The permeate side is purged with a purge gas stream containing steam to produce a gas stream containing oxygen and steam, and at least a portion of the gas stream containing oxygen and steam is fed to the coal gasifier after blending with a pure oxygen stream recovered from the remaining portion of the purge stream or by a parallel nonpurged ion transport separator in the system to achieve the appropriate steam-to-oxygen ratio for the downstream process.

19 Claims, 2 Drawing Sheets

SOLID ELECTROLYTE IONIC CONDUCTOR WITH ADJUSTABLE STEAM-TO-OXYGEN PRODUCTION

FIELD OF THE INVENTION

The invention relates to the use of solid electrolyte ionic conductor systems for oxygen and steam production, and relates in particular to enhancing the oxygen content of a steam-oxygen stream for processes such as coal gasification.

BACKGROUND OF THE INVENTION

Non-cryogenic bulk oxygen separation systems, for example, organic polymer membrane systems, have been used to separate selected gases from air and other gas mixtures. Air is a mixture of gases which may contain varying amounts of water vapor and, at sea level, has the following approximate composition by volume: oxygen (20.9%), nitrogen (78%), argon (0.94%), with the balance consisting of other trace gases. An entirely different type of membrane, however, can be made from certain inorganic oxides. These solid electrolyte membranes are made from inorganic oxides, typified by calcium- or yttrium-stabilized zirconium and analogous oxides having a fluorite or perovskite structure.

Although the potential for these oxide ceramic materials as gas separation membranes is great, there are certain problems in their use. The most obvious difficulty is that all of the known oxide ceramic materials exhibit appreciable oxygen ion conductivity only at elevated temperatures. They usually must be operated well above 500° C., generally in the 600° C. to 900° C. range. This limitation remains despite much research to find materials that work well at lower temperatures. Solid electrolyte ionic conductor technology is described in more detail in Prasad et al., U.S. Pat. No. 5,547,494, entitled Staged Electrolyte Membrane, which is hereby incorporated by reference to more fully describe the state of the art. Since the selectivity of these materials for oxygen is infinite and oxygen fluxes several orders of magnitude higher than for polymeric membranes can be obtained, attractive opportunities are created for the production of oxygen as well as for oxygen-requiring oxidation processes, especially with applications that involve elevated temperatures, for example, coal gasification.

Coal gasification has the potential of utilizing coal reserves for the production of synthetic fuels. Several commercial processes have been developed to produce low-BTU, medium-BTU, and high-BTU gases from coal. Many different types of coal gasification processes are known in the art, for example, fixed bed, fluidized bed, entrained bed, and molten bath bed. These processes can be catalytic or noncatalytic, and each is carried out under widely different conditions. Some of the major gasification processes are described in Chapter 6 of *Coal Liquefaction and Gasification Technologies*, E. C. Mangold et al. (1982). The aspect common to most of these coal gasification processes is the use of steam and oxygen and/or air to carry out a partial and/or complete oxidation of the coal. The steam reforming of coal at high temperatures produces a fuel gas stream containing mainly carbon monoxide and hydrogen gas. Additional steps, however, such as water gas shift reaction and methanation, may be carried out to adjust the composition of the product gas stream. Due to the complex chemistry of coal, other reactions may take place and higher hydrocarbons and tar may also be formed during the coal gasification process.

When air is used as the oxidant, coal gasification generally produces low-BTU gas since the nitrogen in the air stream acts as a diluent. Therefore, use of oxygen or an oxygen-enriched gas stream is generally necessary to form medium-BTU to high-BTU gas stream. In this case, the cost of the required oxygen gas is a significant fraction of the overall coal gasification cost. Thus, the possible integration of coal gasification with a high temperature oxygen production process could be advantageous.

A class of processes that integrate thermal power generation with coal gasification may be referred to as integrated gasification power cycles (IGPC). An integrated gasification combined cycle (IGCC) is a specific embodiment of such a scheme and IGCC is well-known in the art.

In an IGCC (also known as Combined Cycle Coal Gasification, or CCCG) plant, coal is gasified to a fuel gas stream which is supplied to gas turbines employed in a combined cycle power generation system. Thermal integration between coal gasification and power production processes results in improved overall efficiency of the plant.

In gas turbine power cycles, the working fluid is generally air or the products of combustion of fuel and air. Heat is generated within the system by combusting fuel in a compressed air stream and the products of combustion are expanded through a gas turbine to produce power. The metallurgical temperature limit on the turbine blades necessitates a gas turbine operation with a very high oxygen/fuel ratio: nitrogen in the feed air and the excess oxygen act as diluents and lower the temperature of the combustion products. As a result, the exhaust gas stream from the gas turbine power cycle contains excess oxygen which could combust additional fuel. The hot exhaust gas stream could be used to preheat the compressed feed air stream or may also be employed to generate steam that can be used in a vapor power cycle, for example, (a Rankine cycle or its modifications such as reheat and regenerative cycles, dual pressure cycle, and cogeneration cycles).

In a gas power cycle, it is also possible to recover some or all of the excess oxygen in the oxidant gas stream (generally air) either before or after the gas turbine. This oxygen recovery is done at the expense of compressing additional feed air to replace the oxygen removed and the capital costs associated with the oxygen removal system. The oxygen recovery process produces oxygen at a very low incremental power cost, which is attractive compared to other methods of oxygen production. The gases from which oxygen needs to be separated are made available at relatively high temperature (greater than 400° C.), whereas current commercial oxygen production processes typically operate at temperatures below 100° C. Because of this temperature limitation, current commercial oxygen production processes do not gain significantly by integration with a coal gasification process. It appears that novel gas separation processes employing oxygen-ion conductor membranes have the promise of highly synergistic integration which can dramatically lower the cost of oxygen used in coal gasification processes.

Most oxygen generating systems utilize cryogenic separation methods (generally for large scale, high purity applications) or use polymeric membrane or adsorptive separation techniques (generally for small to medium scale, 90–95% purity applications). Membrane systems are typically very power intensive, and are suitable only for the production of small quantities of oxygen-enriched air (for example, 50% oxygen). Some of these processes recover a part of the power utilized in producing the product, however they do not produce any net power.

As mentioned above, traditional oxygen separation processes operate at low temperatures (less than 100° C.), and do not benefit significantly from integration with high temperature processes that utilize oxygen. The elevated temperatures of operation make the ion transport process intrinsically well suited for integration with high temperature processes such as coal gasification and combined cycle power generation, as described in the following references.

A JPL publication D-7790 (1990) has disclosed integration of a high temperature oxygen production process using a zirconia-based oxygen-ion conductor within a CCCG configuration. In this process, oxygen extracted from air by the oxygen-ion conductor is used for coal gasification. Oxygen-depleted air is combusted with the fuel gas produced in the coal gasifier, and expanded in a gas turbine to generate power. The gas turbine exhaust is used to produce steam, which is expanded in a steam turbine to generate additional power.

U.S. Pat. No. 5,306,411 (Mazanec et al.) discusses mixing an inert diluent such as steam with a light hydrocarbon feed gas to produce synthesis gas or unsaturated hydrocarbons as a permeate effluent from the anode side of an ion transport membrane. An oxygen-containing gas is passed through a retentate or cathode side of the membrane; the resulting oxygen-depleted gas withdrawn from the retentate zone apparently is discarded. Mazanec at al. further disclose in U.S. Pat. No. 5,160,713 that steam can be generated in the permeate zone by reaction between hydrogen, introduced as an oxygen-consuming substrate, and oxygen transported through the membrane.

Kang et al., U.S. Pat. No. 5,565,017, entitled High Temperature Oxygen Production with Steam and Power Generation, relates to a system integrating an ion transport membrane with a gas turbine to recover energy from the retentate gas stream after it is heated and steam is added. Water is added to the retentate gas stream from the ion transport module prior to the gas turbine to increase the mass flow in the turbine. This permits the ion transport module and the gas turbine to each operate at its optimum temperature.

In Kang et al., U.S. Pat. No. 5,516,359, entitled Integrated High Temperature Method for Oxygen Production, feed air is compressed and heated in a first heating step (using heat exchanger and combustor) before passing through an oxygen separator employing a mixed conducting oxide. The retentate gas stream from the ion transport module is heated in a second heating step before expanding it through a gas turbine to recover power. The hot exhaust gases from the gas turbine are used to produce steam that is expanded through a steam turbine to generate additional power. In these processes, the operating temperatures of the ion transport module and the gas turbine are independently maintained by controlling the rate of heat addition in the first and second heating steps.

U.S. Pat. No. 5,562,754 (Kang et al.) entitled "Production of Oxygen by Ion Transport Membranes with Steam Utilization" discloses ion transport-based oxygen production integrated with gas turbine power production, in which the permeate side of the ion transport module is swept with an inert sweep gas such as steam to enhance the oxygen flux across the ion transport membrane. As a result a stream containing a mixture of steam and oxygen is produced on the permeate side and can be withdrawn as a product. Kang suggests that this stream can be at a pressure from 2 to 300 psi and could be used to feed a gasifier requiring both steam and oxygen. A closer inspection of Kang's concept reveals that it does not provide a practical solution for generating a steam-oxygen mixture of the required composition and at the required pressure for many of the more practical coal gasification processes. The reasons for this are several: i) Gasification reactors typically operate at pressures well exceeding 300 psia and require steam and oxygen at pressures exceeding 350 psi; ii) It is energy intensive, expensive, potentially unsafe and therefore impractical to compress a steam-oxygen mixture in a compressor; iii) The steam-to-oxygen molar ratio required by the gasification process is typically close to 1, although there are exceptions where it is higher. Using an improbable maximum example having a separator retentate pressure of 300 psia and inlet composition of 20% oxygen, the retentate inlet oxygen partial pressure would be 60 psia which would also be the absolute limit for the oxygen partial pressure at the permeate side pinching end. Under those conditions and at a permeate steam pressure of 350 psia the limiting molar ratio of steam to oxygen would be 4.8, exceeding significantly the typical required value of approximately 1.

OBJECTS OF THE INVENTION

It is therefore an object of the invention to employ a steam purge for the permeate side of an ion transport separator to enhance oxygen recovery and enable generation of an appropriate steam-to-oxygen ratio required for a downstream process such as a gasifier.

It is another object of the invention to provide an efficient integrated process capable of combining solid electrolyte ionic conductor systems with coal gasification systems while providing steam and oxygen at the appropriate molar ratios and pressures required by the gasifier.

It is a further object of the invention to enable incorporation of heat exchangers, steam turbines, heaters, coolers, compressors, and other energy recovery processes to optimize the overall efficiency of the integrated process.

SUMMARY OF THE INVENTION

The invention comprises a process for producing a gas stream containing oxygen and steam to feed a downstream process such as in a coal gasifier to produce a fuel gas stream. In the process a feed gas stream containing elemental oxygen is compressed and then heated. The heated feed gas stream is separated, using at least one ion transport module including an ion transport membrane having a retentate side and a permeate side, into an oxygen-depleted gas stream on the retentate side and an oxygen-containing gas stream on the permeate side. The permeate side of the ion transport membrane is purged using a purge gas stream containing steam to produce a gas stream containing oxygen and steam which is then blended with another oxygen stream to adjust the steam-to-oxygen ratio as desired.

A suitable ratio of steam to oxygen for injection to the gasifier preferably is obtained in one or more of the following ways:

i) A first portion of the steam-oxygen purge stream is blended with an oxygen gas stream which is recovered from the remaining second portion of the purge stream after condensing out the water. The latter oxygen stream can be recovered from the remainder of the purge stream while at the same pressure or after expansion through a power generating turbine. If the oxygen stream has been expanded, the oxygen stream preferably is recompressed by an oxygen compressor to the required injection pressure.

ii) The steam-oxygen purge stream is blended with an oxygen stream recovered from at least a second ion transport separator, preferably configured in a parallel feed arrangement, and compressed to the required pressure by an oxygen compressor before blending.

iii) The purge steam is produced at a high pressure; a portion of the high-pressure stream is directed to the gasifier, and the remainder is used to purge the permeate side of the ion transport separator to produce a steam-oxygen permeate stream, which then is expanded to produce power or cooled. Following this the water is condensed out, and the separated oxygen stream, after compression as required, is blended with the high pressure steam to produce the correct steam-to-oxygen ratio. This embodiment is preferred if the gasifier pressure is very high.

In a preferred embodiment of the invention, the feed gas is air. In another preferred embodiment of the invention, the purge gas stream containing steam is at the same pressure or a greater pressure than the pressure in the coal gasifier. In yet another preferred embodiment of the invention, at least a portion of the oxygen-depleted gas stream is further processed in a second ion transport module to produce a nitrogen gas stream having a purity of greater than 98% for use as a transport gas for pulverized coal for the coal gasifier. In still another preferred embodiment of the invention, heat is recovered from the oxygen-depleted gas stream using an energy extractor. In preferred embodiments of the invention, the energy extractor is a heat exchanger used to accomplish the feed gas heating step or a boiler used to produce the purge gas stream containing steam. In another preferred embodiment of the invention, the energy extractor is used for power production.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

BRIEF DESCRIPTION OF THE DRAWINGS

Other objects, features and advantages of the invention will occur to those skilled in the art from the following description of preferred embodiments of the invention and the accompanying drawings, in which.

DETAILED DESCRIPTION OF THE INVENTION

Figure 1:
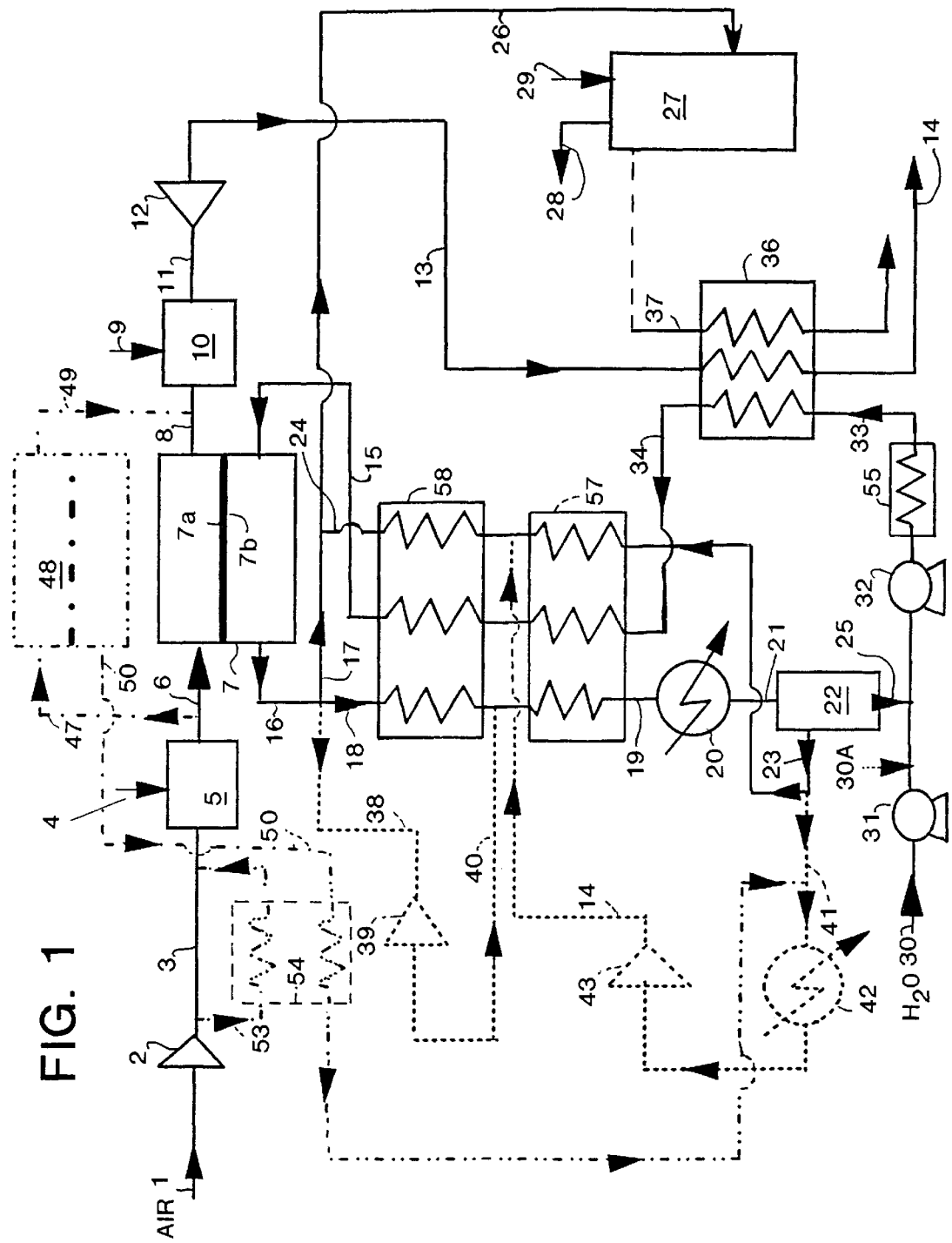
FIG. 1 is a schematic diagram of an embodiment of the invention showing a basic design of the invention having one or two ion transport-based oxygen separation modules installed between the feed compressor and a coal gasifier unit, and showing various options for achieving the correct steam-to-oxygen ratio by blending all or a portion of the steam-oxygen mixture exiting the permeate side of a steam-purged separator with pure oxygen or a water saturated but otherwise pure oxygen product stream.

The essence of the invention is to combine the generation of steam and oxygen for injection into a downstream process such as in a coal gasifier, at the correct ratio of steam to oxygen, by installing at least one or two ion transport oxygen separators in an integrated configuration, such that an oxygen-containing feed gas stream (typically air) flows on the retentate or cathode side of the ion transport membrane, and the permeate or anode side of at least one of the ion transport membranes is purged with steam. Steam purge enhances oxygen transport across the ion transport membrane. A portion of the gas stream containing oxygen and steam leaving the ion transport module is blended with pure oxygen recovered from the unused portion of the steam-oxygen purge stream, or from a second unpurged ion transport membrane, to achieve the required steam-to-oxygen ratio. The blended stream is directed, for example, to a coal gasifier in which coal is oxidized or reformed in the presence of steam and oxygen to produce a fuel gas stream containing mainly carbon monoxide and hydrogen gas.

In an alternate configuration the correct blend of steam and oxygen is achieved by blending a portion of the steam feed to the permeate side of the ion transport membrane with oxygen recovered from the permeate side discharge after condensing out the water.

The feed gas stream that is partially depleted of oxygen in the ion transport module may be used to produce power using a thermal power cycle, for example, a cycle based on gas turbines. The exhaust gas stream from the thermal power production unit is generally hot enough to produce steam that will be utilized in a steam-based power cycle to generate additional power. Processes for adjusting the oxygen/steam ratio in the gases to be employed in the coal gasifier unit are also disclosed.

As noted above, the term "coal gasification" is a very broad term used to describe the conversion of coal into a fuel gas stream. A number of coal gasification processes are practiced commercially in widely different reactor configurations under a broad range of process conditions. Most of these processes require steam and oxygen at different pressures ranging from near atmospheric to 600 psig and at steam to oxygen molar ratios from 1 to 8. In the majority of cases gasification pressures will be above 300 psig and steam to oxygen molar ratios below 2. In this invention, the oxygen ion transport oxygen production process may be applied to any of these coal gasification processes or other downstream processes as described below.

The need for blending can be appreciated from the following discussion. In typical systems the air feed pressure will rarely exceed 300 psi and separator inlet oxygen content will be between 16 and 18%. Therefore, the partial oxygen pressure at the separator inlet will be below 48 to 54 psia. Under these conditions the highest partial oxygen pressure possible in the permeate exit stream is less than those values. If the gasification reactor requires a minimum steam-oxygen pressure of 365 psia, the lowest steam-to-oxygen ratio possible is less than (365−54)/54, which is equal to 5.76. Since these are limiting values, practical considerations require blending in almost every case.

The elevated temperatures of operation make ion transport processes according to the present invention well suited for integration with high temperature processes such as coal gasification and thermal power cycles and enables substantial reductions in the cost of the oxygen required by the gasification process. In the process configuration of this invention, the oxygen ion transport module is thermally decoupled from the coal gasifier. Thus, each section may operate at its respective optimum operating temperature. Also, the pressure drop across the ion transport membrane itself will be relatively small. Thus an integration such as described herein should not adversely affect the efficiency and performance of available cycles but instead boost their efficiency and cost effectiveness by economically combining steam and oxygen generation.

The present invention employs one or more ion transport modules, at least one of which uses steam as a purge gas stream, and produces a gas stream containing steam and oxygen, both of which are necessary for coal gasification or other downstream applications. In addition, the retentate gas stream from the ion transport modules contains sufficient oxygen to be used for power production. This power generation may be based on technologies such as gas turbines, vapor turbines or a combination thereof. If gas turbines are used for power generation, no modifications are necessary to the gas turbine, since the only change is that an oxygen-containing gas stream with a lower oxygen content than air is used. Moreover, the heat input required at several points in the process configurations may be provided using traditional or ion transport combustors, fired or electric heaters, or ion transport reactor-heaters such as disclosed in more detail in U.S. Pat. No. 5,820,655, which is incorporated herein by reference.

FIG. 1 is an embodiment of the invention having an ion transport-based oxygen separation module installed between the feed compressor and the coal gasifier. During operation, oxygen-containing feed gas stream 1 (typically air) is compressed in compressor 2 to produce compressed gas stream 3. Preferably, at least a portion 53 of compressed gas stream 3 is heated in heat exchanger 54 against gas stream 50. Gas stream 3 is heated to the required ion transport membrane temperature in heater 5, which may be a conventional heater, a combustor, or ion transport combustor/heater, to produce heated gas stream 6. Alternatively, fuel may directly be added to stream 6 and combustion carried out in ion transport module 7 to generate heat in situ. Gas stream 6 then enters ion transport module 7 employing an ion transport membrane having a retentate side 7a and a permeate side 7b.

Ion transport module 7 separates oxygen from oxygen-containing gas stream 6 to produce permeate gas stream 16 and nitrogen-enriched retentate gas stream 8. At the same time, gas stream 15 containing steam is used to purge the permeate side 7b of ion transport membrane 7; therefore, gas stream 16 contains both steam and oxygen. If the permeate side purge stream is above gasifier pressure, gas stream 16 may be divided into first portion stream 17 and second portion stream 18 as shown in FIG. 1. After optional adjustment of its temperature by heating or cooling (not shown), stream 17 is blended with pure oxygen stream 24 to the steam-to-oxygen ratio required by the coal gasification process and injected into coal gasifier 27 as stream 26.

The pure oxygen stream 24 blended into stream 17 can come from several sources. The illustrated embodiment recovers oxygen from stream 18, the second portion of steam-oxygen stream 16. Stream 18 is cooled in heat exchangers 58 and 57 to produce stream 19 which is sent through water- or air-cooled condenser 20 where most of the water contained in stream 19 is condensed to produce stream 21. Stream 21 is separated in separator 22 into water 25 and water saturated oxygen stream 23 which is heated recuperatively in heat exchangers 57 and 58 to produce stream 24 suitable for blending with stream 17 to produce blended stream 26.

In another embodiment, shown in phantom, the second portion of the steam oxygen stream 16 is directed as stream 38 to steam turbine 39 to generate power by expansion to form expanded stream 40, then cooled in heat exchanger 57, condensed in condenser 20, and separated into water and oxygen as described for the first embodiment. In this embodiment, however, the oxygen will be at a pressure slightly above atmospheric and stream 23, directed as stream 41, is further cooled in cooler 42 and then compressed by oxygen compressor 43 to produce compressed oxygen stream 14 which is suitable for blending with stream 17 after heating in heat exchanger 58 to produce blended stream 26. This second embodiment is more energy efficient than the first, because part of the heat expended in steam generation is recovered as power, but does have the complication of added heat exchangers and an added oxygen compressor. It is likely that the second embodiment is preferred for lower steam-to-oxygen ratios where more of the required oxygen is provided by the oxygen blend stream, for larger systems, and for higher fuel costs.

A third embodiment for generating pure oxygen for blending purposes includes installing optional second ion transport separator 48 in parallel with steam purged separator 7. In this case feed air stream is split into stream 47 and stream 6. The volume of stream 47 may be adjustable by a valve (not shown). Stream 47 enters separator 48 and is separated into a pure oxygen permeate 50 and an oxygen depleted retentate stream 49 which is combined with the retentate stream 8 from separator 7. Oxygen stream 50 is cooled in heat exchanger 54 and cooler 42 and compressed by oxygen compressor 43 to produce stream 14 which is heated in exchanger 58 to produce compressed hot pure oxygen stream 24 which is then blended with steam-oxygen stream 17 to generate the desired gasifier steam-oxygen feed stream 26. In this embodiment all of permeate stream 16 is directed as stream 17. This configuration minimizes the amount of steam generated to that required by the gasification process at the expense of larger separator areas since a smaller amount of oxygen is generated in the more efficient steam purged oxygen separator.

Regarding the retentate side of separator 7 for all three embodiments, oxygen depleted stream 8 is optionally heated in combustor 10 using fuel stream 9 or an indirectly fired heater to produce stream 11 at the desired turbine inlet temperature when stream 11 is optionally expanded in turbine 12 to produce power. Even after expansion stream 13 is sufficiently hot to aid in the generation of steam 34 in boiler 36. After transferring most of its usable heat the oxygen-depleted stream 14 typically is discarded. Optionally a portion or all of stream 13 can be employed in preheating feed stream 3 thereby reducing required fuel stream 4 for heater 5, but this would increase the amount of fuel required in the boiler 36.

To complete the steam generating circuit, condensed water stream 25 is combined with make-up water stream 30 which is raised to a higher pressure by pump 31 or make-up stream 30A in case the water condensing pressure is at ambient levels. The combined boiler feed water stream is pumped to the required pressure by pump 32 and heated in feed water heater 55 to produce high pressure feed water 33 which is evaporated in boiler 36 and superheated in heat exchangers 57 and 58.

The heat required for generating superheating steam 34 is provided by stream 13, preferably together with recovery of useful heat from gases produced in the gasifier as schematically indicated by stream 37. In many instances additional fuel is burned in boiler 36 to satisfy the energy balance. It will be apparent to those skilled in the art when implementing the present invention that process integration requires careful balancing of available heat capacity with heat requirements at appropriate temperature levels to permit optimum utilization of heat and avoid excessive pinches in temperature differences.

Stream 29 represents coal feed and stream 28 the raw gas exiting the gasifier 27. For clarity's sake additional details of the conventional gasifier cycle, including heat recovery and purification, are not shown.

Note that the fuel needs of the process configuration shown in FIG. 1 can be met most desirably by using fuel gas stream 28 produced in coal gasifier unit 27. An external fuel gas (for example, natural gas), however, may also be used. In addition, if coal 29 contains substantial amounts of sulfur compounds, desulfurization of fuel gas stream 28 may need to be carried out. Other substances contained in the coal that are detrimental to the environment and/or the process according to the present invention will need to be removed as well.

Depending on the range of ion transport operating temperature and pressure, the configuration of FIG. 1 may have to be modified. Note that in the embodiment shown in FIG. 1, the anode-side pressure in the ion transport module will be dictated by the pressure at which the coal gasifier unit operates, since it is not practical to compress the hot permeate gas stream leaving the ion transport module. The temperature of the permeate stream containing steam and oxygen that leaves the ion transport module may be higher than that needed in the coal gasifier unit, in which case the permeate stream may be cooled (preferably against the incoming steam or the feed air) to the temperature needed in the coal gasifier unit. If the ion transport module operates at a lower temperature than the coal gasifier unit, a heater may be placed between them. Also, if the ion transport module operates at a higher pressure than the coal gasifier unit, a steam turbine may be placed between them to partially expand the permeate stream.

Suitable materials for the ion transport membrane 7 are the mixed and dual phase conductors of Table I.

TABLE I

Examples of Mixed Conducting Solid Electrolytes

1. $(La_{1-x}Sr_x)(Co_{1-y}Fe_y)O_{3-\delta}$
2. $SrMnO_{3-\delta}$
   $SrMn_{1-x}Co_xO_{3-\delta}$ ($0 \leq x \leq 1, 0 \leq y \leq 1$, $\delta$ from stoichiometry)
   $Sr_{1-x}Na_xMnO_{3-\delta}$
3. $BaFe_{0.5}CO_{0.5}Y_3$
   $SrCeO_3$
   $YBa_2Cu_3O_{7-\beta}$ ($0 \leq \beta \leq 1$)
4. $La_{0.2}Ba_{0.8}Co_{0.8}Fe_{0.2}O_{2.6}$
   $Pr_{0.2}Ba_{0.8}Co_{0.8}Fe_{0.2}O_{2.6}$
5. $A_xA'_{x'}A''_{x''}B_yB+_{y'}B''_{y''}O_{3-z}$ ($x, x', x'', y, y', y'', z$ are all in the 0–1 range)
   where: A, A', and A" are from groups 1, 2, and 3 and the f-block lanthanides;
   and B, B', and B" are from the d-block transition metals.
6. (a) Co—La—Bi type: Cobalt oxide 15–75 mole %
   Lanthanum oxide 13–45 mole %
   Bismuth oxide 17–50 mole %
   (b) Co—Sr—Ce type: Cobalt oxide 15–40 mole %
   Strontium oxide 40–55 mole %
   Cerium oxide 15–40 mole %
   (c) Co—Sr—Bi type: Cobalt oxide1 0–40 mole %
   Strontium oxide 5–50 mole %
   Bismuth oxide 35–70 mole %
   (d) Co—La—Ce type: Cobalt oxide 10–40 mole %
   Lanthanum oxide 10–40 mole %
   Cerium oxide 30–70 mole %
   (e) Co—La—Sr—Bi type: Cobalt oxide 10–70 mole %
   Lanthanum oxide 1–40 mole %
   Strontium oxide 1–40 mole %
   Bismuth oxide 25–50 mole %
   (f) Co—La—Sr—Ce type: Cobalt oxide 10–40 mole %
   Lanthanum oxide 1–35 mole %
   Strontium oxide 1–35 mole %
   Cerium oxide 30–70 mole %

TABLE I-continued

Examples of Mixed Conducting Solid Electrolytes

7. $Bi_{2-x-y}M'_xM_yO_{3-\delta}$ ($0 \leq x \leq 1, 0 \leq y \leq 1$, $\delta$ from stoichiometry)
   where: M' is Er, Y, Tm, Yb, Tb, Lu, Nd, Sm, Dy, Sr, Hf, Th, Ta, Nb, Pb, Sn, In, Ca, Sr, and La and mixtures thereof; and
   M is Mn Fe, Co, Ni, and Cu and mixtures thereof.
8. $BaCe_{1-x}Gd_xO_{3-x/2}$ where $x$ equals from 0 to 1
9. One of the materials of the $A_sA'_tB_uB'_vB''_wO_z$ family whose composition is disclosed in Mazanec et al., U.S. Pat. No. 5,306,411, as follows:
   A represents a lanthanide or Y, or a mixture thereof;
   A' represents an alkaline earth metal or a mixture thereof;
   B represents Fe;
   B' represents Cr or Ti, or a mixture thereof; and
   B" represents Mn, Co, V, Ni or Cu, or a mixture thereof;
   and $s, t, u, v, w$, and $x$ are numbers such that:
   $s/t$ equals from about 0.01 to about 100;
   $u$ equals fromabout 0.01 to about 1;
   $v$ equals from zero to about 1;
   $w$ equals from zero to about 1;
   $x$ equals a number that satisfies the valences of the A, A', B, B', and B" in the formula; and
   $0.9 < (s + t)/(u + v + w) < 1.1$.
10. One of the materials of the $La_{1-x}Sr_xCu_{1-y}M_yO_{3-\delta}$ family
    where: M represents Fe or Co;
    $x$ equals from zero to about 1;
    $y$ equals from zero to about 1; and
    $\delta$ equals a number that satisfies the valences of La, Sr, Cu, and M in the formula.
11. One of the materials of the $Ce_{1-x}A_xO_{2-\delta}$ family
    where: A represents a lanthanide, Ru, or Y; or a mixture thereof;
    $x$ equals from zero to about 1;
    and
    $\delta$ equals a number that satisfies the valences of Ce and A in the formula.
12. One of the materials of the $Sr_{1-x}Bi_xFeO_{3-\delta}$ family
    where:
    $x$ equals from zero to about 1;
    and
    $\delta$ equals a number that satisfies the valences of Ce and A in the formula.
13. One of the materials of the $Sr_xFe_yCo_zO_w$ family
    where: $x$ equals from zero to about 1;
    $y$ equals from zero to about 1;
    $z$ equals from zero to about 1;
    $w$ equals a number that satisfies the valences of Sr, Fe, and Co in the formula.
14. Dual phase mixed conductors (electronic/ionic):
    $(Pd)_{0.5}/(YSZ)_{0.5}$
    $(Pt)_{0.5}/(YSZ)_{0.5}$
    $(B—MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13 of this table, to which a high temperature metallic phase (for example, Pd, Pt, Ag, Au, Ti, Ta, or W) is added.

A preferred material is $La_{1-x}Sr_xCo_{1-y}Fe_yO_{3-\delta}$. The porous substrate can be made from the same material or consist of one or several layers of other material which are chemically compatible with adjacent materials at operating temperatures. Possible alternate materials can be less expensive oxides such as zirconia, ceria, yttria, alumina or metals such as chrome-nickel containing superalloys.

Figure 2:
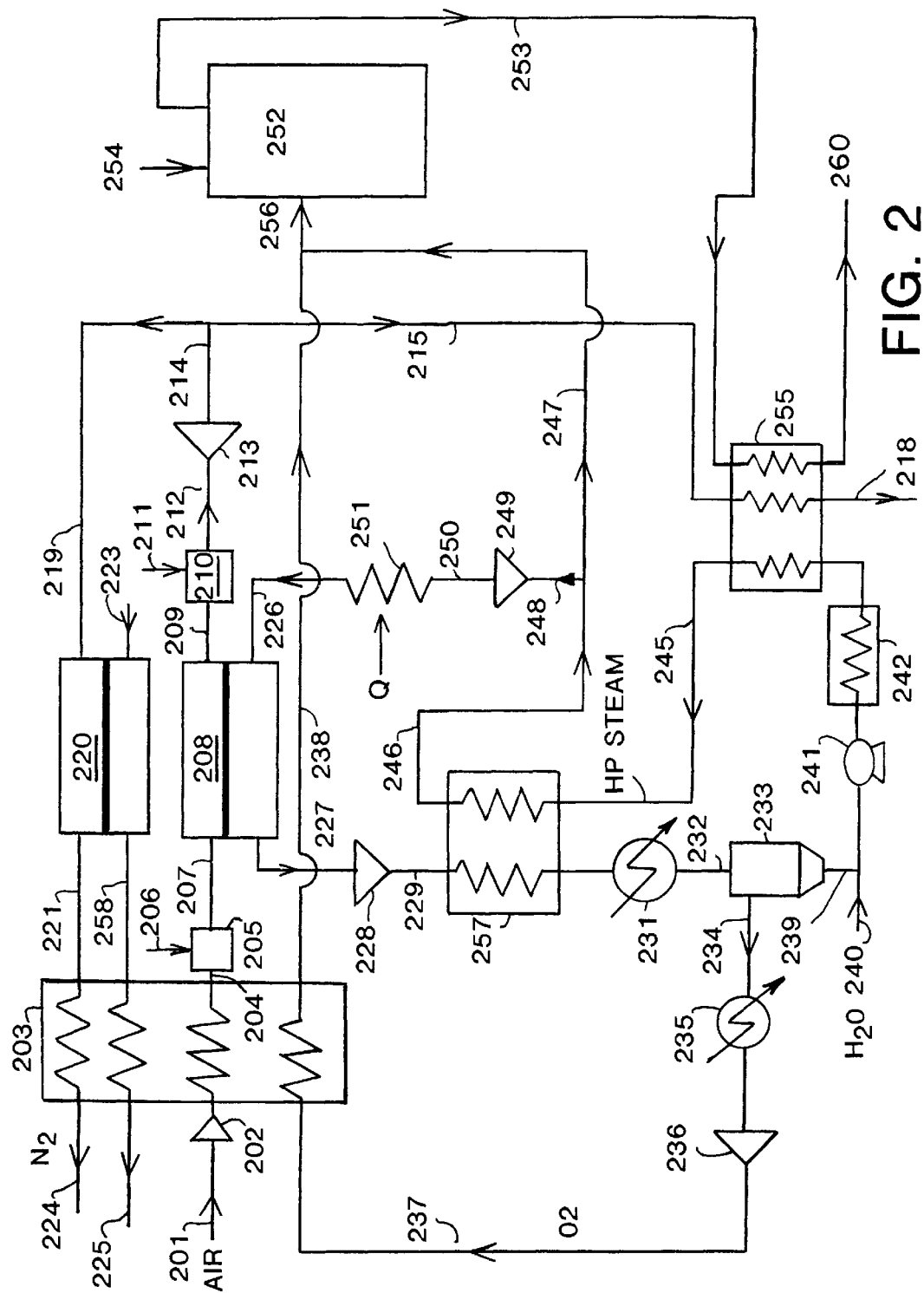
FIG. 2 is a schematic diagram of another embodiment of the invention similar to FIG. 1 but including a high pressure steam turbine stage where a portion of the high pressure steam is blended with oxygen recovered by condensing out the water from the steam purge stream and where the high pressure turbine discharge is used for purging the separator permeate side. The figure also illustrates co-production of nitrogen for powdered coal transport and injection.

An alternative construction is presented in FIG. 2. This construction is best suited for high reactor pressures, lower air side pressures, and low steam-to-oxygen ratios. Air 201 is compressed by air compressor 202 to a pressure preferably from 20 to 300 psia and optionally preheated in heat exchanger 203 to produce compressed air stream 204. Stream 204 is further heated to the required separator inlet temperature of typically 600 to 1000° C. by direct combustion with fuel 206 in combustor 205. Other embodiments utilize different ways of heating as discussed for FIG. 1.

Heated compressed feed stream 207 in this construction is then introduced to the cathode side of ion transport separator 208 where a fraction of the contained oxygen is separated by ion transport to the anode or permeate side.

The oxygen depleted retentate stream 209 is optionally further heated to turbine inlet temperature typically 1200 to 1500° C. in a combustor 210 with the addition of fuel stream 211 to produce stream 212 which is expanded in turbine 213 to produce power and an exhaust stream 214 at a pressure of 15 to 20 psia. Stream 214 in this construction is split into a first retentate stream 215 which is sent to a steam generating plant, represented by boiler 255, for recovery of available heat, after which the cooler stream exits as stream 218, and a second retentate stream 219 which is sent to a reactively purged ion transport separator 220. Separator 220 functions as a deoxo unit which separates the residual oxygen by ion transport to the anode side where it reacts with fuel purge stream 223 to produce a very low partial oxygen pressure and thereby enhance oxygen removal. A heat sink for absorbing the heat of reaction is available as the result of the lower temperature stream 219 due to expansion as part of stream 214.

Retentate stream 221 is a product nitrogen stream which after recovery of heat by exchanger 203 or alternately by the steam generating plant can be employed as stream 224 as a propellant for powdered coal transport. Products of combustion stream 258 give up available heat in exchanger 203 and is then discharged as stream 225. Optionally $CO_2$ can be recovered from that stream since it contains primarily $CO_2$ and water.

As indicated above, separator 208 is purged with steam stream 226 to enhance oxygen separation. The purge stream is taken from the exhaust 250 from high pressure steam turbine stage 249 and reheated in exchanger 251. Hot permeate stream 227 containing oxygen and steam is expanded in low pressure turbine stage 228 to produce stream 229 at an intermediate temperature. Stream 229 is desuperheated against high pressure steam 245 in exchanger 257 and then introduced into condenser 231 where most of the contained steam condenses to produce cooled stream 232 which is separated in separator 233 into water stream 239 and water saturated oxygen gas 234. Stream 234 is further cooled in a heat exchanger or cooler 235 and then compressed in oxygen compressor 236 to the required pressure for injection into the gasifier 252. Before injection into the gasifier 252, stream 237 is heated in exchanger 203 and blended in correct proportion with superheated high pressure steam stream 247 to achieve a desired steam-to-oxygen ratio. Blended gas stream 256 is fed into gasifier 252 with coal feed stream 254. Raw gas stream 253 exits the gasifier 252 and is sent to recovery boiler 255 prior to removal as stream 260.

High pressure steam 246 is generated by mixing water stream 239 with make-up water 240, pumping the combined stream to the required pressure by pump 241, heating it in feed water heater 242, evaporating it in boiler 255 and super heating it in heat exchanger 257 to a temperature sufficiently high to avoid condensation of moisture during expansion of purge portion 248 in high pressure steam turbine stage 249. High pressure superheated steam 246 is split into purge stream 248, which is expanded in turbine stage 249 then reheated and used to purge the permeate side of separator 208, and stream 247 which is blended with oxygen stream 238 to form blended gas stream 256. As in FIG. 1, heat requirements for steam generation may exceed available waste heat and require burning of additional fuel in the boiler.

The embodiment presented in FIG. 2 has several advantages. It uncouples the required permeate side pressure from the reactor pressure, it permits independent optimization of steam purge rates, and results in an energy efficient Rankine cycle as illustrated for a very similar system in co-filed application entitled "Solid Electrolyte Ionic Conductor Oxygen Production With Power Generation", Keskar et al. (Attorney Docket No. D-20345). A disadvantage is that all the oxygen required by the process is compressed by oxygen compressors in contrast to the systems of FIG. 1 where a portion of the required oxygen is available at the same pressure as the high pressure steam.

The present invention may be realized in many different ways. For example, the present configuration may be easily modified to gasify organic waste (for example, biological and industrial waste) or petroleum coke, or to partially oxidize hydrocarbons. In addition, the combustors and boilers may themselves be ion transport modules, thereby reducing/eliminating $NO_x$ formation.

Typical ranges for operating parameters of the ion transport module are as follows:

Temperature
Typically in the 400° C. to 1500° C. range, and preferably in the 600° C. to 1200° C. range.

Pressure
The purge-side pressure will be typically in 3–40 atm range, and preferably 1–10 atm. The feed-side pressure will be 1–40 atm if pressurized nitrogen is needed as a product or if the ion transport exhaust gas goes to a gas turbine for power generation, 1–10 atm otherwise.

Oxygen Ion Conductivity of the Ion Transport Membrane
Typically in the 0.01–100 S/cm range (1 S=1/Ohm).

Thickness of the Ion Transport Membrane
Ion transport membrane can be employed in the form of a dense film, or a thin film supported on a porous substrate. The thickness (t) of the ion transport membrane/layer is typically less than 5000 microns, preferably it is less than 1000 microns, and most preferably it is less than 100 microns.

Configuration
The ion transport membrane elements may typically be tubular or planar.

Although pressure-driven ion transport modules are preferred for the simplicity of their design, the ideas described here are applicable to systems utilizing either an electrically-driven or a pressure-driven oxygen separation unit employing oxygen-ion conductors.

In addition, optimizations with respect to the choice of the ion transport material, film thickness and membrane area best suited for this application may be exercised. Also, for a given ion transport module, the amount of oxygen separated in the ion transport module may easily be varied according to the needs by varying the feed-pressure, the feed air flow rate, or ion transport operation temperature.

Therefore, specific features of the invention are shown in one or more of the drawings for convenience only, as each feature may be combined with other features in accordance with the invention. In addition, various changes and modifications may be made to the examples given without departing from the spirit of the invention. For example, the blending of the oxygen and steam stream together with the separate oxygen stream may be accomplished internally or externally to a coal gasification process. Alternative embodiments will be recognized by those skilled in the art based on the teachings herein and they are intended to be included within the scope of the claims.

What is claimed is:

1. A process for producing a gas stream containing oxygen and steam at a desired ratio, the process comprising:
   (a) compressing a feed gas stream containing elemental oxygen;
   (b) heating the feed gas stream;
   (c) separating the heated feed gas stream using at least one ion transport module including an ion transport membrane having a retentate side and a permeate side into an oxygen-depleted gas stream on the retentate side and an oxygen-containing gas stream on the permeate side;
   (d) purging the permeate side of the ion transport membrane using a purge gas stream containing steam to produce a gas stream containing oxygen and steam;
   (e) feeding at least a first portion of the gas stream containing oxygen and steam to a downstream process; and
   (f) cooling the remaining second portion of the gas stream containing oxygen and steam, separating the contained oxygen by condensing out water, and blending the resulting oxygen stream with the first portion of the purge stream, where the first and the second portions are proportioned to produce a steam-to-oxygen ratio that is desirable for the downstream process.

2. The process according to claim 1, wherein the feed gas is air.

3. The process according to claim 2, wherein the purge gas stream containing steam is at the same pressure or a greater pressure than the pressure in the downstream process.

4. The process according to claim 2, wherein at least a portion of the oxygen-depleted gas stream is further processed in a second ion transport module to produce a nitrogen gas stream having a purity of greater than 98% for use as a transport gas for the downstream process.

5. The process according to claim 4, wherein the downstream process includes coal gasification in a coal gasifier to produce a fuel gas steam, and the nitrogen gas stream is used as a transport gas for pulverized coal for the coal gasifier.

6. The process according to claim 1, wherein heat is recovered from the oxygen-depleted gas stream using an energy extractor.

7. The process according to claim 6, wherein the energy extractor is a heat exchanger used to accomplish the feed gas heating step.

8. The process according to claim 6, wherein the energy extractor is a boiler used to produce the purge gas stream containing steam.

9. The process according to claim 6, wherein the energy extractor is used for power production.

10. The process according to claim 1, wherein the cooling of the second portion is accomplished at least in part by heat exchange with at least one of the feed gas stream or the heated feed gas stream.

11. The process according to claim 1, wherein the gas stream containing oxygen and steam is heated before feeding at least a portion of the gas stream containing oxygen and steam to the downstream process.

12. The process according to claim 1, wherein the purge gas stream is at a pressure from about 3 atm to about 40 atm.

13. The process according to claim 1, wherein a steam gas stream is injected into a coal gasifier as part of the downstream process.

14. The process according to claim 13, wherein the second portion of the steam gas stream is expanded in a steam turbine to produce a steam gas stream at an atmospheric or intermediate pressure and to generate power.

15. A process for producing a gas stream containing oxygen and steam to feed a coal gasifier to produce a fuel gas stream, the process comprising:
   (a) compressing a feed gas stream containing elemental oxygen;
   (b) heating the feed gas stream;
   (c) separating the heated feed gas stream using at least two ion transport modules including ion transport membranes having a retentate side and a permeate side into an oxygen-depleted gas stream on the retentate side and an oxygen-containing gas stream on the permeate side;
   (d) purging the permeate side of one of the ion transport membranes using a purge gas stream containing steam to produce a gas stream containing oxygen and steam;
   (e) separating oxygen by at least the other of the ion transport membranes without purging the permeate side of the other ion transport membrane, and then cooling, compressing and reheating the resulting pure oxygen stream;
   (f) blending the pure oxygen stream with the gas stream containing steam and oxygen where the two streams are proportioned to produce the steam to oxygen ratio required by the coal gasification process; and
   (g) feeding the blended gas stream containing oxygen and steam to a coal gasifier for coal gasification to produce the fuel gas stream.

16. A process according to claim 15 where the two ion transport membrane separators are installed in a parallel feed configuration.

17. A process for producing a gas stream containing oxygen and steam to feed a coal gasifier to produce a fuel gas stream, the process comprising:
   (a) compressing a feed gas stream containing elemental oxygen;
   (b) heating the feed gas stream;
   (c) producing steam at a high pressure required for injection to a coal gasifier;
   (d) expanding a portion of the high pressure steam stream in a turbine to an intermediate pressure to produce power and an expanded stream containing steam;
   (e) separating the heated feed gas stream using an ion transport module including an ion transport membrane having a retentate side and a permeate side into an oxygen-depleted gas stream on the retentate side while purging the permeate side of the ion transport membrane using the expanded stream containing steam to produce a gas stream containing oxygen and steam;
   (f) cooling the gas stream containing oxygen and steam;
   (g) separating the oxygen contained in said gas stream by condensing out water;
   (h) blending the resulting oxygen stream with the remaining unexpanded, high pressure steam stream where the two streams are proportioned to produce the steam-to-oxygen ratio required by the coal gasification process; and
   (i) injecting the resulting blended stream containing steam and oxygen into the gasifier.

18. A process according to claim 17 where the expanded stream containing steam and oxygen is further expanded in a second turbine to produce power before separation of the contained oxygen.

19. A process for producing a gas stream containing oxygen and steam at a desired ratio, the process comprising:
   (a) compressing a feed gas stream containing elemental oxygen;

(b) heating the feed gas stream;

(c) separating the heated feed gas stream using at least one ion transport module including an ion transport membrane having a retentate side and a permeate side into an oxygen-depleted gas stream on the retentate side and an oxygen-containing gas stream on the permeate side;

(d) purging the permeate side of the ion transport membrane using a purge gas stream containing steam to produce a gas stream containing oxygen and steam;

(e) feeding at least a first portion of the gas stream containing oxygen and steam to a downstream process; and (f) blending a separate oxygen stream with the first portion of the purge stream to produce a steam-to-oxygen ratio that is desirable for the downstream process.

* * * * *

UNITED STATES PATENT AND TRADEMARK OFFICE
CERTIFICATE OF CORRECTION

PATENT NO. : 5,964,922
DATED : October 12, 1999
INVENTOR(S) : Keskar et al.

It is certified that error appears in the above-indentified patent and that said Letters Patent is hereby corrected as shown below:

Column 9,
In composition 1, line 1, after "$O_{3-\delta}$" insert
-- ($0 \le x \le 1$, $0 \le y \le 1$, $\delta$ from stoichiometry) --.

In composition 12, line 5 (column 10, line 35), delete "of Ce and A".

In claim 5, line 3, replace "steam" with --stream--.